US008308842B2

(12) United States Patent
Nosella et al.

(10) Patent No.: US 8,308,842 B2
(45) Date of Patent: Nov. 13, 2012

(54) PYROPHORIC IRON NANOPARTICLES AND CONTINUOUS PROCESSES FOR PRODUCTION THEREOF

(75) Inventors: Kimberly D. Nosella, Mississauga (CA); Santiago Faucher, Oakville (CA); Ke Zhou, Mississauga (CA); Paul J. Gerroir, Oakville (CA); Richard P. N. Veregin, Mississauga (CA); Karen A. Moffat, Brantford (CA)

(73) Assignee: Xerox Corporation, Norwalk, CT (US)

( * ) Notice: Subject to any disclaimer, the term of this patent is extended or adjusted under 35 U.S.C. 154(b) by 9 days.

(21) Appl. No.: 12/962,961

(22) Filed: Dec. 8, 2010

(65) Prior Publication Data
US 2012/0145947 A1 Jun. 14, 2012

(51) Int. Cl.
*B22F 9/18* (2006.01)
*C22B 5/00* (2006.01)
*C21B 15/00* (2006.01)

(52) U.S. Cl. ............... 75/371; 75/316; 75/343; 75/370; 75/373; 75/774; 75/738; 75/740; 977/777; 977/810; 102/335

(58) Field of Classification Search .................. 75/316, 75/343, 370, 371, 373, 774, 738, 740; 102/335; 977/777, 810; 252/188.28
See application file for complete search history.

(56) References Cited

U.S. PATENT DOCUMENTS

| 8,066,831 | B2 * | 11/2011 | Gangopadhyay et al. ........ 149/3 |
| 8,152,893 | B2 * | 4/2012 | Lin et al. .......................... 75/347 |
| 2002/0068187 | A1 * | 6/2002 | O'Connor et al. ............. 428/546 |
| 2003/0190475 | A1 * | 10/2003 | Carpenter et al. ............. 428/403 |
| 2007/0269880 | A1 * | 11/2007 | Paknikar .................... 435/235.1 |
| 2007/0290175 | A1 * | 12/2007 | Kim ............................... 252/500 |
| 2011/0064675 | A1 * | 3/2011 | Hadjipanayis et al. ...... 424/9.34 |
| 2012/0070770 | A1 * | 3/2012 | Zhou et al. ................. 430/106.3 |
| 2012/0091401 | A1 * | 4/2012 | Hotta ............................ 252/513 |

* cited by examiner

*Primary Examiner* — Joseph D Anthony
(74) *Attorney, Agent, or Firm* — MH2 Technology Law Group LLP

(57) ABSTRACT

Pyrophoric nanoparticles and methods of producing the same are provided herein. An exemplary method of producing pyrophoric nanoparticles can include providing a first aqueous solution comprising at least one metal salt and an aliphatic polyether; providing a second solution comprising a metal hydride reducing agent; continuously combining the first and second solutions to produce nanoparticles in a liquid phase; separating the nanoparticles from the liquid phase; and drying the nanoparticles to form pyrophoric nanoparticles. The pyrophoric nanoparticles can have a diameter ranging from about 1 nm to about 50 nm.

15 Claims, 2 Drawing Sheets

PYROPHORIC IRON NANOPARTICLES AND CONTINUOUS PROCESSES FOR PRODUCTION THEREOF

FIELD OF USE

The disclosure herein relates to pyrophoric nanoparticles and methods of producing said nanoparticles.

BACKGROUND

Pyrophoric nanoparticles can spontaneously ignite and burn when in contact with atmospheric oxygen. Such nanoparticles contain metals that can react with oxygen gas in the atmosphere to form metal oxides in a natural oxidation reaction. This natural oxidation reaction is a spontaneous exothermic process that usually proceeds slowly; however, the oxidation reaction can induce pyrophoricity and proceed much more quickly by increasing the exposed surface area of the metal. For example, by producing particles in a very fine powder form, the surface area available to react with atmospheric oxygen is greatly increased and can be high enough to cause the particles to spontaneously ignite.

The disclosed nanoparticles can be useful for various thermal applications where heat release is desirable, for instance in hand warmers. The disclosed nanoparticles can also be used where oxygen- or air-free environments are needed. For example, the disclosed pyrophoric nanoparticles can be used in a shlenk line or other vacuum gas manifolds, instead of vacuum and/or inert gas, since the pyrophoric nanoparticles can quickly scavenge small amounts of air or oxygen present in the reaction vessel to ensure the reaction vessel remains oxygen/air-free. Additionally, the disclosed pyrophoric nanoparticies can be used as an inexpensive alternative in chemical syntheses (e.g., of pthalocyanine at low temperatures) where activated elemental nickel and copper are typically used as catalysts.

Pyrophoric nanoparticles are often produced by including oxalate salts in a mixture and heating the mixture to produce metal-containing particles in situ. The resultant metal-containing nanoparticles can participate in a thermite (pyrophoric) reaction or serve as a catalyst. Typical oxalate salts include nickel- or copper-based type salts that can be very costly due to their high trading prices, for example. Current demands remain for both copper and nickel in other industrial uses so these metal prices will likely continue to escalate.

Yields for prior processes to achieve small particles, i.e., less than 50 nm, are typically less than 30%. Low yields, in combination with high material costs, produce expensive nanoparticles and in turn increase the price of end products.

Thus, there is a need to produce pyrophoric nanoparticles that are less expensive, and for methods that deliver higher throughputs and yields than current methods.

SUMMARY

According to various embodiments, the present teachings include a method of producing pyrophoric nanoparticles including providing a first aqueous solution comprising at least one metal salt and a functional polyether; providing a second solution comprising a metal hydride reducing agent; continuously combining the first and second solutions to produce nanoparticles in a liquid phase; separating the nanoparticles from the liquid phase; and drying the nanoparticles to form pyrophoric nanoparticles.

According to various embodiments, the present teachings also include a method of producing iron pyrophoric nanoparticles including providing a first aqueous solution comprising a metal salt and a functional polyether having the following structure:

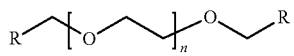

wherein R can be —COOH, —OH, —NH$_2$, or —SH, and wherein n is a number of from about 1 to about 100; providing a second solution comprising a metal hydride reducing agent selected from the group consisting of sodium borohydride, lithium aluminum hydride, diisobutylaluminum hydride, lithium triethylborohydride, and mixtures thereof; continuously combining the first and second solutions to produce iron nanoparticles in a liquid phase; separating the iron nanoparticles from the liquid phase; and drying the iron nanoparticles to form pyrophoric iron nanoparticles, wherein more than about 30% of the pyrophoric nanoparticles have a diameter ranging from less than about 50 nm to about 1 nm.

Additional advantages of the embodiments will be set forth in part in the description which follows, and in part will be obvious from the description, or may be learned by practice of the disclosure.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

The above embodiments will become apparent as the following description proceeds upon reference to the drawings, which include the following figures.

DESCRIPTION OF THE EMBODIMENTS

Figure 1:
FIGS. 1 and 2 depict pyrophoric nanoparticles produced by batch processes.

Reference will now be made in detail to embodiments of the present teachings, examples of which are illustrated in the accompanying drawings. The following detailed description should not be taken in a limiting sense and the scope of the present teachings is defined by the appended claims and their equivalents.

In an aspect, methods of producing pyrophoric nanoparticles are provided herein. A first solution comprising at least one metal salt and a functional polyether can be provided. The metal salts can include mixed metal salts, metal chlorides, metal sulfates, metal phosphates, metal citrates, metal nitrates, or the like, hydrates thereof, and mixtures thereof. Mixed metal salts can include those of the transition metals, as well as mixtures of two or more of those metals. In an aspect, the mixed metal salts can include salts of iron cobalt. The metal of the metal salt can be Fe, Co, Ni, Cu, or the like. The metal salt can be, for example, iron (II) chloride tetrahydrate, iron (III) sulfate tetrahydrate, iron (III) phosphate tetrahydrate, iron (III) citrate tetrahydrate, cobalt chloride, iron cobalt salts, or the like, and mixtures thereof. In an aspect, the metal salt can be iron (II) chloride tetrahydrate, cobalt chloride, iron cobalt salts, and mixtures thereof. The functional polyether can have the following structure

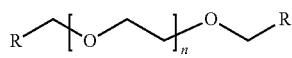

wherein R is selected from the group consisting of —COOH, —OH, —NH$_2$, or —SH, and wherein n is a number of from about 1 to about 100 or from about 5 to about 50.

The metal salt and functional polyether can be dissolved in any suitable solvent, such as water (e.g., deionized water). The metal salts can be any mixture or combination and in any molar ratio, so long as they are soluble in water.

A second solution comprising a metal hydride reducing agent can be provided. The metal hydride can be sodium borohydride, lithium aluminum hydride, diisobutylaluminum hydride, lithium triethylborohydride, or the like, and mixtures thereof. The metal hydride can be dissolved in any suitable solvent, such as water (e.g., deionized water) or basic solution (e.g., sodium hydroxide solution). The metal hydride reducing agent can be any mixture or combination and in any molar ratio, so long as it is soluble.

In an aspect, the molar ratio of metal salts to metal hydride can range from about 0.1:1 to about 2:1, for example from about 0.4:1 to about 1:1. The first and second solutions can be continuously combined to form nanoparticles in a liquid phase.

As used herein, "continuously combined" is understood to mean mixing, combining, blending, and the like, of solutions disclosed herein in a continuous process, for example in a continuous reactor, as opposed to a batch process. In embodiments, a continuous process can be conducted at temperatures ranging from about 30° C. to about 45° C. at atmospheric pressure for as long as necessary to complete the reaction (e.g., about 40 minutes to about 60 minutes to about 90 minutes to about 145 minutes and higher, as desired). In contrast, a batch reaction is typically conducted at much higher temperatures (i.e., 60° C. to 85° C.) for a much shorter period of time (i.e., 30 minutes). Without being limited by any particular theory, a continuous process according to the present disclosure allows for much higher throughput, yield, and smaller particle size, as compared to a batch process. The nanoparticles synthesized according to the present disclosure can have a diameter ranging from about 1 nm to about 50 nm, for example from about 1 nm to about 25 nm, such as from about 5 nm to about 10 nm. Nanoparticles according to the present disclosure can have a needle-like or circular shape.

A continuous process according to the present disclosure can permit percent yields of small particles (e.g., from about 1 nm to about 50 nm, for example from about 1 nm to about 25 nm, such as from about 5 nm to about 10 nm) of more than about 30%, for example about 50% and above, such as about 70% and above. The percent yield (e.g., X%) can be understood to mean any sample taken during or after synthesis having about X% of its particles sized from about 1 nm to about 50 nm, for example from about 1 nm to about 25 nm, such as from about 5 nm to about 10 nm. For instance, a 30% yield can be understood to mean any sample taken during or after synthesis having about 30% of its particle sized from about 1 nm to about 50 nm, for example from about 1 nm to about 25 nm, such as from about 5 nm to about 10 nm. The yield can be quantified by any known method in the art.

The nanoparticles can be separated from the liquid phase by any known process, for example by decantation, filtration, and the like. In an aspect, the nanoparticles can be separated by decantation from the mother liquor. The nanoparticles can be dried after separation to form pyrophoric nanoparticles by any known process, for example by using freeze-drying techniques or heating in an oven, into a very fine powder. In an aspect, the nanoparticles can be freeze dried. In an embodiment, the wet product after decantation can be frozen in an air-tight environment (e.g., in an air-tight glass bottle and the like) with an alcohol (e.g., isopropyl alcohol and the like) at a low temperature (e.g., about −32° C. or less). The frozen product can be transferred to a freeze dryer for two days where the liquid in the product sublimes to water vapor under low vacuum (e.g., less than about 500 mTorr) and low temperature (e.g., less than about −50° C.). As a result of their small size and increased surface, area that is exposed to air, the nanoparticles can be pyrophoric. In other words, without being limited by theory, it is believed that due to the small particle size, the surface area available to react with oxygen is sufficiently high enough to cause the disclosed nanoparticles to spontaneously and instantly ignite upon contact with oxygen—i.e., to become pyrophoric. The nanoparticles disclosed herein can reach temperatures of about 60° C. to about 80° C.

The nanoparticles disclosed herein can also act as an oxygen scavenger for reactions involving oxygen-free reaction conditions (e.g., in schlenk lines, vacuum gas manifolds, and the like) without the use of expensive equipment or inert gases. Without being limited by theory, it is believed that the disclosed nanoparticles quickly scavenge oxygen present in the reaction vessel.

The nanoparticles disclosed herein can also be used in the synthesis of phthalocyanine, such as in processes where activated forms of elemental nickel or copper are used as catalysts. The disclosed nanoparticles can act as catalysts in these synthesis reactions. For example, the nanoparticles disclosed herein can be used as catalysts in the synthesis of non-substituted metal pthalocyaninates at low temperatures, such as from about 0° C. to about 50° C.

Methods for producing pyrophoric nanoparticles are provided herein. These methods can include providing a first aqueous solution comprising at least one metal salt and a functional polyether. A second solution comprising a metal hydride reducing agent can also be provided. The first and second solutions can be continuously combined to produce nanoparticles in a liquid phase. The nanoparticles can be separated from the liquid phase, and can be dried to form pyrophoric nanoparticles. In an aspect, more than 30%, such as more than for example more than 70%, of the pyrophoric nanoparticles produced have a diameter ranging from about 1 nm to about 50 nm.

EXAMPLES

Comparative Example 1

Batch Process

Into a first beaker (1000 mL) was added 5.73 grams of iron (II) chloride tetrahydrate, 2.06 grams of cobalt chloride, 6.6 grams of poly(ethylene glycol)bis(carboxymethyl)ether (C-PEG), and 500 grams of deionized water. The mixture in the first beaker was sonicated for 10 minutes to dissolve the reactants in water. Into a second beaker (600 mL) was measured 2.4 grams of sodium borohydride and 250 grams of deionized water. The mixture in the second beaker was sonicated for 5 minutes to dissolve the sodium borohydride in water. The mixture in the first beaker was then poured into a 4 L beaker, stirred for 1 minute using a magnetic stir bar, and then the mixture in the second beaker was added to the same 4 L beaker. The mixture continued to be stirred in the 4 L beaker for 30 minutes under argon. Resultant nanoparticles were decanted from the mother liquor and dried in a freeze drier. Yield (assuming ½ surfactant remained) was 13.3%.

Figure 2:
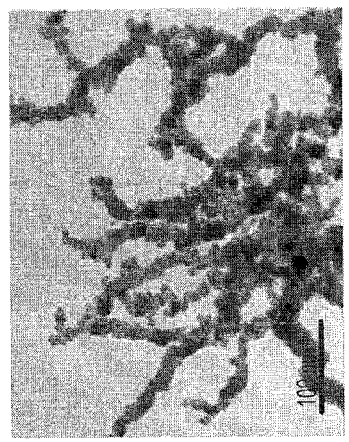

The nanoparticles were observed by transmission electron microscopy. As illustrated in FIG. 2, nanoparticles were greater than 50 nm in size and were not pyrophoric.

Comparative Example 2

Batch Process

Into a first beaker (600 mL) was added 5.73 grams of iron (II) chloride tetrahydrate, 2.06 grams of cobalt chloride, and 250 grams of deionized water. The mixture was sonicated for 10 minutes to dissolve the reactants in water. Into a second beaker (4 L) was added 6.6 grams of C-PEG and 250 grams of deionized water. The mixture was stirred for about 10 minutes with a magnetic stir bar. The mixture in the first beaker was poured into the 4 L beaker containing C-PEG and stirred for 10 minutes with a magnetic stir bar. Into a third beaker (600 mL) was added 2.4 grams of sodium borohydride and 250 grams of deionized water, and the mixture was sonicated for 5 minutes to dissolve the sodium borohydride. The mixture in the third beaker was then poured into the 4 L beaker, and the entire mixture was stirred for 30 minutes under argon. Resultant nanoparticles were decanted from mother liquor and dried in a freeze dryer.

The nanoparticles were observed by transmission electron microscopy. As illustrated in FIG. 1, nanoparticles were greater than 50 nm in size and were not pyrophoric.

Example 3

Continuous Process

Into a first beaker (200 mL) was added 9.46 grams of iron (II) chloride tetrahydrate, 4.12 grams of cobalt chloride, 6.56 grams of C-PEG, and 38.67 grams of deionized water. The mixture in the first beaker was sonicated for 10 minutes to dissolve the reactants in water. Into a second beaker (50 mL) was added 32.71 grams of sodium borohydride solution (12 wt. % sodium borohydride in 14M sodium hydroxide solution). The mixture in the first beaker was poured into a 60 mL syringe and loaded into a syringe pump set at a pumping rate of 11.24 g/min. The mixture in the second beaker was poured into another 60 mL syringe and loaded into another syringe pump set at a pumping rat of 6.25 g/min. The two syringes were joined with tubing to a polyether ether ketone (PEEK) T-joint (from Postnova Analytics). Nanoparticle products were collected in a 250 mL flask containing methanol and purged with argon. The nanoparticle products were then decanted from the methanol and dried in a freeze dryer into a very fine powder. Yield (assuming ½ surfactant remained) was 75.5%

Figure 3:
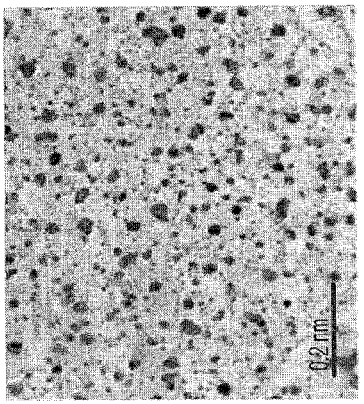
FIGS. 3 and 4 depict pyrophoric nanoparticles according to an embodiment of the present disclosure.
Figure 4:
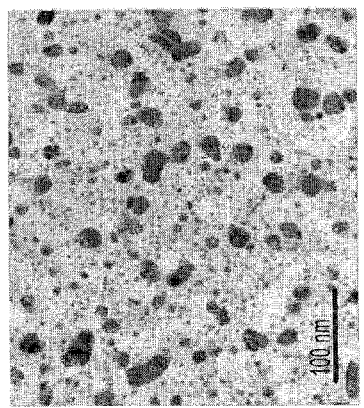

The nanoparticles were observed by transmission electron microscopy. As illustrated in FIGS. 3 and 4, nanoparticles were less than 50 nm in size and were pyrophoric.

Example 4

Continuous Process

Into a first beaker (200 mL) was added 9.46 grams of iron (II) chloride tetrahydrate, 4.12 grams of cobalt chloride, 13.13 grams of C-PEG, and 38.67 grams of deionized water. The mixture in the first beaker was sonicated for 10 minutes to dissolve the reactants in water. Into a second beaker (50 mL) was added 21.26 grams of sodium borohydride solution (12 wt. % sodium borohydride in 14M sodium hydroxide solution). The mixture in the first beaker was poured into a 60 mL syringe and loaded into a syringe pump set at a pumping rate of 19.1 g/min. The mixture in the second beaker was poured into another 60 mL syringe and loaded into another syringe pump set at a pumping rate of 6.25 g/min. The two syringes were joined with tubing to a polyether ether ketone (PEEK) T-joint (from Postnova Analytics). Nanoparticle products were collected in a 250 mL flask containing methanol and purged with argon. The nanoparticle products were then decanted from methanol and dried in a freeze dryer into a very fine powder.

Figure 6:
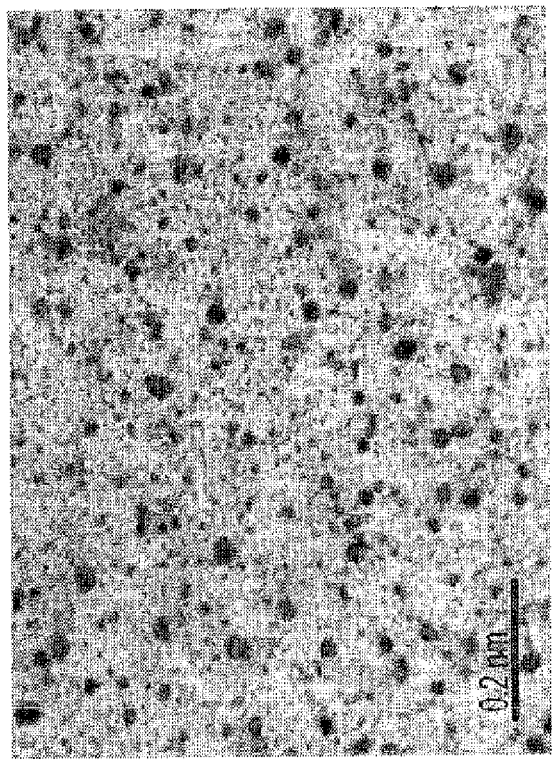
FIGS. 5 and 6 depict pyrophoric nanoparticles according to another embodiment of the present disclosure.
Figure 5:
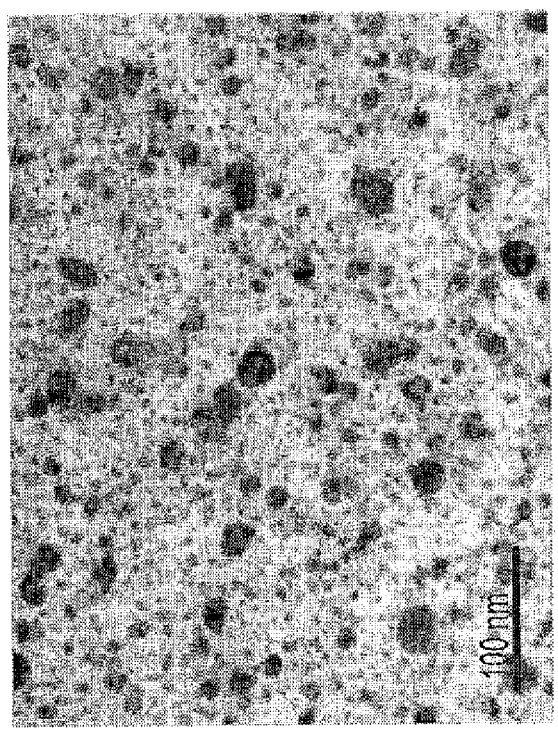

The nanoparticles were observed by transmission electron microscopy. As illustrated in FIGS. 5 and 6, nanoparticles were less than 10 nm in size and were pyrophoric.

Table 1 below summarizes Comparative Example 1 and Example 3, having the same molar ratios of reactants.

TABLE 1

| ID | Reactor | NaBH4:Fe/Co Molar Ratio | Fe:Co Molar Ratio | Yield |
|---|---|---|---|---|
| Comp. Ex. 1 | Batch | 1.67:1 | 64.4:35.6 | 13.3% |
| Example 3 | Continuous | 1.67:1 | 64.4:35.6 | 75.5% |

As shown in Table 1, the continuous process according to the present disclosure increased yield by at least 80% as compared to conventional batch processes. As can be seen in FIGS. 3-6, the continuous process according to the present disclosure generated much smaller, more uniform nanoparticles than conventional batch processes in FIGS. 1-2. The nanoparticles produced according to the present disclosure were also pyrophoric, whereas nanoparticles produced according to batch processes were not.

Table 2 below summarizes Examples 3 and 4 with different molar ratios of iron to cobalt.

TABLE 2

| ID | Reactor | NaBH4:Fe/Co Molar Ratio | Fe:Co Molar Ratio |
|---|---|---|---|
| Example 3 | Continuous | 1.67:1 | 64.4:35.6 |
| Example 4 | Continuous | 1.67:1 | 60:40 |

As shown in Table 2 and FIGS. 3-6, the nanoparticles remained very small (less than 50 nm) and pyrophoric, regardless of changing iron to cobalt ratios.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the present teachings will be apparent to those skilled in the art from consideration of the specification and practice of the present teachings disclosed herein. As used herein, "exemplary" indicates the description is used as an example, rather than implying that it is an ideal. It is intended that the specification and examples be considered as exemplary only, with a true scope and spirit of the embodiments being indicated by the following claims. It is intended that the specification and examples be considered as exemplary only, with a true scope and spirit of the present teachings being indicated by the following claims.

What is claimed is:

1. A method of producing pyrophoric nanoparticles, the method comprising:
   providing a first aqueous solution comprising at least one metal salt and a functional polyether;
   providing a second solution comprising a metal hydride reducing agent;
   continuously combining the first aqueous solution and the second solution to produce nanoparticles in a liquid phase;
   separating the nanoparticles from the liquid phase; and
   drying the nanoparticles to form pyrophoric nanoparticles.

2. The method of claim 1, wherein the metal salt is selected from the group consisting of mixed metal salts, metal chlorides, metal sulfates, metal phosphates, metal citrates, metal nitrates, hydrates thereof, and mixtures thereof.

3. The method of claim 1, wherein the metal salt comprises a metal and the metal is selected from the group consisting of Fe, Co, Ni, Cu, and mixtures thereof.

4. The method of claim 1 wherein the metal salt is selected from the group consisting of iron (II) chloride tetrahydrate, iron (III) sulfate tetrahydrate, iron (III) phosphate tetrahydrate, iron (III) citrate tetrahydrate, cobalt chloride, iron cobalt, and mixtures thereof.

5. The method of claim 1, wherein the functional polyether has the following structure

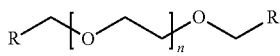

wherein R is selected from the group consisting of —COOH, —OH, —NH$_2$, and —SH, and wherein n is a number of from about 1 to about 100.

6. The method of claim 1, wherein the functional polyether is poly(ethylene glycol) bis (carboxymethyl) ether.

7. The method of claim 1, wherein the metal hydride reducing agent is selected from the group consisting of sodium borohydride, lithium aluminum hydride, diisobutylaluminum hydride, lithium triethylborohydride, and mixtures thereof.

8. The method of claim 7, wherein the metal hydride reducing agent is sodium borohydride.

9. A method of producing iron pyrophoric nanoparticles, the method comprising:
   providing a first aqueous solution comprising at least one iron salt and a functional polyether having the following structure

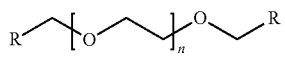

wherein R is selected from the group consisting of —COOH, —OH, —NH$_2$, and —SH, and wherein n is a number of from about 1 to about 100;
   providing a second solution comprising a metal hydride reducing agent selected from the group consisting of sodium borohydride, lithium aluminum hydride, diisobutylaluminum hydride, lithium triethylborohydride, and mixtures thereof;
   continuously combining the first aqueous solution and the second solution to produce iron nanoparticles in a liquid phase;
   separating the iron nanoparticles from the liquid phase; and
   drying the iron nanoparticles to form pyrophoric iron nanoparticles,
   wherein more than about 30% of the pyrophoric nanoparticles have a diameter ranging from about 1 nm to about 50 nm.

10. The method of claim 9, wherein the iron salt is selected from the group consisting of mixed metal iron salts, iron chlorides, iron sulfates, iron phosphates, iron citrates, iron nitrates, hydrates thereof, and mixtures thereof.

11. The method of claim 9, wherein the iron salt is selected from the group consisting of iron (II) chloride tetrahydrate, iron (III) sulfate tetrahydrate, iron (III) phosphate tetrahydrate, iron (III) citrate tetrahydrate, iron cobalt salts, and mixtures thereof.

12. The method of claim 9, wherein the functional polyether is poly(ethylene glycol)bis(carboxymethyl)ether.

13. The method of claim 9, wherein the metal hydride reducing agent is sodium borohydride.

14. The method of claim 9, wherein the molar ratio of metal salts to metal hydride reducing agent ranges from about 0.1:1 to about 2:1.

15. The method of claim 9, wherein the molar ratio of metal salts to metal hydride reducing agent ranges from about 0.4:1 to about 1:1.